Figure 1:
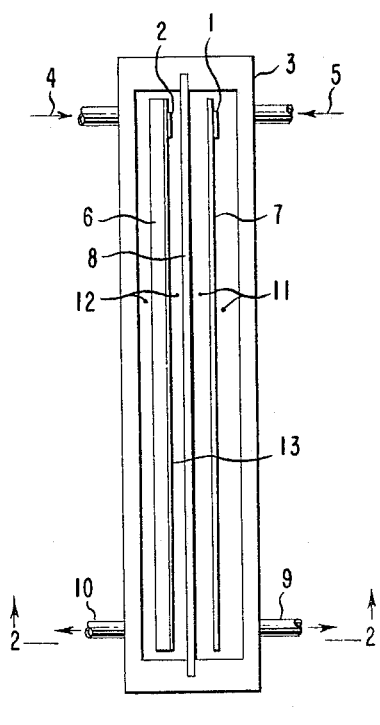

Nov. 1, 1966  E. V. KRING ET AL  3,282,735

FUEL CELL INCLUDING PLATINUM CONTAINING ELECTRODES

Filed Feb. 25, 1963

INVENTORS
ELBERT V. KRING
WILLIAM R. WOLFE, JR.

BY  *Amos G. Cole*

AGENT

3,282,735
FUEL CELL INCLUDING PLATINUM
CONTAINING ELECTRODES
Elbert V. Kring and William R. Wolfe, Jr., Wilmington, Del., assignors to E. I. du Pont de Nemours and Company, Wilmington, Del., a corporation of Delaware
Filed Feb. 25, 1963, Ser. No. 260,496
6 Claims. (Cl. 136—86)

This invention relates to fuel cells and more particularly to fuel cells employing a peroxygen compound as oxidant in an acidic electrolyte.

Fuel cells are devices for converting the free energy of chemical reactions into electrical energy as the chemical reactants are fed to the cell. The application of Kring, Serial No. 246,245, filed December 20, 1962, describes fuel cells employing active platinum electrodes and an acidic electrolyte divided by a membrane permeable to hydronium ions into a catholyte portion having dissolved therein a peroxygen compound and an anolyte portion having dissolved therein a fuel. The application of Kring, Serial No. 246,244, filed December 20, 1962, describes an improved cathode for such fuel cells, which cathode is one having an active platinum surface, e.g., an electrodeposited platinum surface, which has been heated in an atmosphere containing molecular oxygen. Such heating renders the platinum surface to be exposed to the catholyte more selective in its activity.

It is an object of the invention to provide a fuel cell of the above type which combines therein the above improved heat treated active platinum surface cathode with an improved anode. A further object is to provide a fuel cell in which said improved cathode and improved anode are employed in a fuel cell having an acidic electrolyte whose catholyte portion contains a peroxygen compound such as hydrogen peroxide and whose anolyte portion contains a fuel such as methanol. Other objects will be apparent from the following description.

The fuel cell of the invention comprises:
(a) An acidic aqueous electrolyte; (b) a membrane separating the electrolyte into a catholyte portion having dissolved therein a peroxygen compound and an anolyte portion having dissolved therein a fuel, which membrane is impermeable to the peroxygen compound and the fuel but is permeable to hydronium ions; (c) a cathode in contact with the catholyte portion of the electrolyte, which cathode comprises an active electrodeposited platinum surface which has been heated at a temperature of at least 200° C. in an atmosphere comprising molecular oxygen; and (d) an anode in contact with the anolyte portion of the electrolyte, which anode comprises a porous electroconductive support having an active coating of a mixture of platinum, acetylene black and a binder.

The main electrochemical reactions which occur at and are catalyzed by the electrodes during operation of the fuel cell are believed to be as indicated by the following equations when hydrogen peroxide is employed as the oxidant and methanol as the fuel. Methanol is oxidized at the anode as follows:

$$CH_3OH + H_2O = CO_2 + 6H^+ + 6e^-$$

The resulting hydrogen ions migrate (as hydronium ions $H_3O^+$) through the membrane where the hydrogen peroxide is reduced at the cathode as follows:

$$3H_2O_2 + 6H^+ + 6e^- = 6H_2O$$

The electrons liberated at the anode flow to the cathode when the electrodes are connected through an external electrical circuit. The overall cell reaction can be represented as follows:

$$3H_2O_2 + CH_3OH \rightarrow CO_2 + 5H_2O + \text{electrical energy}$$

The surface of the cathode which catalyzes the reaction occurring at the cathode is referred to as the "active" cathode surface, while the surface of the anode which catalyzes the reaction occurring at the anode is referred to as the "active" anode surface.

The active platinum surface of the cathode is generally a platinum surface which has been electrodeposited from a chloroplatinic acid solution, or a solution of any other suitable platinum compound, using well known electroplating methods. Such electrodeposited platinum not only actively catalyzes the desired reaction at the cathode, but also actively catalyzes the wasteful decomposition of hydrogen peroxide according to the equation:

$$2H_2O_2 = 2H_2O + O_2$$

When a cathode having an active electrodeposited platinum surface is heated at a temperature of at least 200° C., e.g., 200 to 1200° C., preferably 260 to 800° C., in an atmosphere containing molecular oxygen, the activity of the platinum surface to catalyze such wasteful decomposition of the peroxygen compound is greatly reduced while its activity to catalyze the desired electrochemical reaction at the cathode remains substantially unaffected. The heat treatment is preferably effected in air but any atmosphere containing from 1 to 100% by volume of molecular oxygen, with the balance being inert components such as nitrogen, can be used. Heating times of 1 to 100 hours in air under the preferred conditions are quite effective.

When an electrode having an electrodeposited platinum surface was allowed to stand for 45 minutes in a 5 molar sulfuric acid catholyte solution containing 7% $H_2O_2$ by weight, it catalyzed the decomposition of 56.9% of the hydrogen peroxide present. After that same electrode had been heated in air for 17 hours at 260° C. and then allowed to stand in a catholyte solution of the same composition, only 16% of the peroxide was decomposed under the same conditions. Tests employing the electrode initially and after the heat treatment as the cathode in an acidic hydrogen peroxide half cell showed that the heat treatment did not significantly affect the activity of the cathode in catalyzing the electrochemical reaction necessary to the operation of the cell.

The active platinum surface of the cathode can be electrodeposited by conventional electroplating methods onto any solid electroconductive base or support which is resistant to the catholyte and the conditions employed in the above heat treatment. Examples of suitable base materials are stainless steel, nickel, titanium, gold and platinum in the form of plates, screens or sintered metal shapes.

As disclosed in Kring application Serial No. 246,245, electrodes having an active electrodeposited surface can be employed as the anode in acidic peroxide fuel cells employing a fuel such as methanol. However, cells employing such an anode are characterized by excessive anode polarization which results in a relatively low cell voltage. In contrast, anode polarization is significantly lower when employing the present improved anode in conjunction with the above improved cathode, with the result that a substantially higher cell voltage is obtained.

The present anode is a combination of a porous electroconductive support or base with a coating thereon having a catalytic surface. The porous support can be any solid conductive material which is resistant to the anolyte under the conditions of use and is in a porous form such as that provided by a wire mesh or by sintering the material in particulate form at a suitable temperature to form a porous plate. Any of the conventional methods for forming wire mesh or porous plate supports can be used. Suitable support materials are stainless steel, platinum, titanium, gold, porous carbon, and the like.

The coating which is applied to the porous anode support is a mixture of platinum and acetylene black bound together with a polymeric binder. The weight ratio of platinum to acetylene black can range from about 1:20 to 1:1. The binder usually will constitute from about 10 to 75% of the combined weight of the platinum and acetylene black. The binder serves only to bind the coating components together and to hold them onto the support; it does not enter into or affect the reaction at the anode. Accordingly, most polymeric materials can be used, examples of which are chlorinated butyl rubber, polystyrene, polymethyl methacrylate, polyethylene terephthalate, polyvinyl chloride, polyurethanes, polybutadiene, polyisoprene and chlorinated polyethylenes. Of course, polymeric materials containing known catalyst poisons, e.g., sulfur, should be avoided.

The acetylene black component of the coating should be as conductive as possible in order to minimize the internal resistance of the cell. The electrical resistivity of commercially available acetylene blacks range from about 0.001 to about 0.030 ohm/inch and such products are suitable as are also more conductive acetylene blacks.

The composition for coating the porous anode support can be prepared by intimately mixing the binder, a platinum compound (which is reducible to yield the desired amount of platinum) and the acetylene black in the presence of a solvent for the binder. The slurry is then applied to the support and the platinum compound is reduced by means of hydrogen, e.g., at 20 to 100° C. at atmospheric pressure, or by treatment with formaldehyde. The reduction can also be effected before application of the coating composition to the support. Alternatively and preferably, the composition for coating the porous anode support can be prepared by intimately mixing the acetylene black and a platinum compound (which is reducible to yield the desired amount of platinum) in distilled water and reducing the platinum compound with an appropriate amount of formaldehyde, e.g. at 40 to 100° C. After washing and drying the resulting platinum-acetylene black composition, the desired amount of binder is added and a slurry is made by adding a solvent for the binder. The solvent used for dissolving the binder should be free of catalyst poisons, otherwise any known solvent for the chosen binder may be used. Some of the solvents that may be used are dioxane, methanol, formic acid, ethanol, ethyl acetate, butyl acetate, dioxolane, ether, cyclohexanone, acetic acid, and the like.

Optionally and preferably, the catalytic surface obtained by coating as indicated above can be platinized by electrodepositing platinum thereon using conventional electroplating techniques.

The acid component of the electrolyte may be any protonic acid, i.e., any substance which gives hydronium ions ($H_3O^+$) in aqueous solution, which acid has the required solubility in water, does not adversely affect the electrodes or the membrane, does not react with the peroxygen compound to destroy its oxidizing power and does not react with the fuel to destroy its reducing power. Examples of such acids are sulfuric acid, phosphoric acid and the 2 to 4 carbon aliphatic carboxylic acids such as acetic and propionic acids. The preferred acid is sulfuric acid which is preferably employed as 0.1 to 10, most preferably 2 to 7, molar aqueous solutions.

The peroxygen compound employed in the catholyte portion of the electrolyte is preferably hydrogen peroxide, although other peroxygen compounds such as peroxyformic acid, peroxyacetic acid, peroxypropionic acid, peroxymonosulfuric acid ($H_2SO_5$, Caro's acid) and potassium peroxymonosulfate can be used. The concentration of the peroxygen compound in the catholyte should be at least 0.01 molar and may be as high as 20 molar or greater, depending upon its solubility. Concentrations from about 0.5 to 2.0 molar are most generally preferred.

Methanol is the preferred fuel but others such as ethanol, the propanols, the butanols, allyl alcohol, ethylene glycol, glycerine, sucrose, formaldehyde, acetaldehyde, formic acid and the like, can be used. The concentration of the fuel in the anolyte should generally be at least 0.1 molar with concentrations of 0.75 to 13 molar being preferred. Higher concentrations can be employed.

Figure 2:
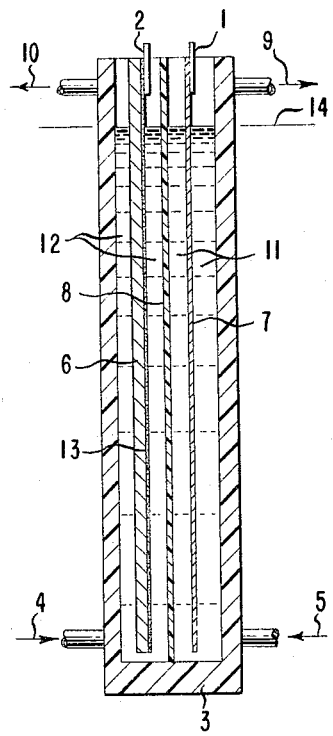

The drawings illustrate a fuel cell constructed in accordance with the invention. FIG. 1 is a plan view of the cell while FIG. 2 is a cross-sectional view thereof along line 2—2 of FIG. 1.

In the drawings, 1 is a connecting tab on cathode 7, 2 is a connecting tab on anode 6 while 3 is the cell case or container. The latter may be constructed of any material such as glass or clear polymethyl acrylate resin which is resistant to the anolyte and catholyte mixtures and is also a non-conductor of electricity. Cathode 7 is a heat-treated platinum surfaced cathode prepared as described in Example 1 while anode 6 is a porous platinum support provided with a catalytic coated surface 13 as described in Example 1. Membrane 8, made of a sulfonated copolymer of styrene and divinylbenzene, divides the cell into a catholyte compartment 11 and an anolyte compartment 12. Such a membrane may be made of any cation exchange resin yielding a membrane which is permeable to hydronium ions but impermeable to the peroxygen compound and the fuel. The sulfonic acid type cation exchange resins, particularly those in which the sulfonic acid groups are attached directly to the aromatic nuclei of a copolymer of a monovinyl aromatic hydrocarbon such as styrene and a polyvinyl aromatic hydrocarbon such as divinyl benzene are preferred resins. Cation exchange resins of this type containing from 1 to 16% divinyl benzene by weight as crosslinking agent and membranes made thereof for use in fuel cells are well known and available commercially. Fresh anolyte such as an equi-volume mixture of methanol and 5 molar sulfuric acid solution is fed to the cell by way of inlet tube 4, and spent anolyte is removed by way of exit tube 10. Fresh catholyte such as a 2 molar $H_2O_2$ solution in 5 molar sulfuric acid is fed to the cell by way of inlet tube 5 and spent catholyte is removed by way of exit tube 9. The electrolyte level in the cell is indicated by line 14 in FIG. 2.

The invention is illustrated by the following examples:

*Example 1*

A cathode was prepared by cleaning a platinum sheet in chromic acid at 21° C. for 5 minutes, then plating it at 20 ma./cm.$^2$ for 1 minute per side in a 3% by weight chloroplatinic acid solution. A gray platinum deposit was obtained and the cathode was then heated in air for 17.3 hours at 260° C., whereby the rate of decomposition of peroxide in the presence of the cathode at open circuit is markedly reduced.

An anode was prepared by sintering —400 mesh (U.S. standard screen scale) platinum powder loosely packed in a graphite mold for 2 hours at 1000° C. The resulting anode support was coated with 9 mg./cm.$^2$ of a mixture of platinum and a commercial acetylene black in a weight ratio of 1:4, which mixture also contained chlorinated butyl rubber as binder. The catalyst:binder weight ratio was 2:1. The catalyst was prepared by mixing 0.4 g. of the acetylene black with 6.3 ml. of $H_2PtCl_6$ (0.0159 g. Pt/ml.) in a beaker, covering the mixture with distilled water, adding 3 to 4 ml. of 37% formaldehyde solution and heating the resulting mixture until the yellow color of the chloroplatinic acid solution had disappeared. The solution was filtered, the filter cake washed with distilled water and dried, and then mixed in a mortar with 0.25 g. of chlorinated butyl rubber and dioxane. After painting the anode support with the resulting composition, it was coated with platinum black by electrodeposition from a chloroplatinic acid solution.

A fuel cell as illustrated in the drawings was assembled using the above cathode and anode and a commercial homogeneous cation exchange membrane which was a sulfonated copolymer of styrene and divinylbenzene. Operating at 30° C. with a catholyte of 2 molar $H_2O_2$ in 5 molar $H_2SO_4$ and an anolyte of an equi-volume mixture of methanol and 5 molar $H_2SO_4$, the cell had an open circuit voltage of 0.52 volt and delivered 25 ma./cm.$^2$ at 0.105 volt.

*Example 2*

Using the experimental setup as described in Example 1 except that the catholyte was 1 molar $H_2O_2$ in 5 molar $H_2SO_4$, the cell had an open circuit voltage of 0.54 volt and delivered 25 ma./cm.$^2$ at 0.135 volt.

*Example 3*

Using the experimental setup as described in Example 1 except that the catholyte was 1 molar $H_2SO_5$ in 5 molar $H_2SO_4$, the cell had an open circuit voltage of 0.53 volt and delivered 25 ma./cm.$^2$ at 0.085 volt.

*Example 4*

Using the experimental setup as described in Example 1 except that the catholyte was 1 molar $H_2O_2$ in 5 molar $H_2SO_4$ and the cell was operated at 50° C., the cell had an open circuit voltage of 0.46 volt and delivered 25 ma./cm.$^2$ and 50 ma./cm.$^2$ at 0.335 volt and 0.05 volt, respectively.

The fuel cell of the invention is advantageous over fuel cells employing alkaline electrolytes in that the wasteful decomposition of the peroxygen compound is much less because of the use of the acidic electrolyte and the improved cathode. A further advantage resulting from the improved anode is that anode polarization is reduced and a resultant higher cell voltage is realized. The cell is operable at ambient temperatures and the by-product carbon dioxide from the oxidation of the fuel does not react with the acidic electrolyte and escapes readily because of its insolubility therein.

The embodiments of the invention in which an exclusive property or privilege is claimed are as follows:

1. A fuel cell comprising: (a) an acidic aqueous electrolyte; (b) a membrane separating said electrolyte into a catholyte portion having dissolved therein a peroxygen compound and an anolyte portion having dissolved therein a fuel, said membrane being permeable to hydronium ions but impermeable to said peroxygen compound and said fuel; (c) a cathode in contact with said catholyte portion, which cathode comprises an active electrodeposited platinum surface which has been heated at a temperature of at least 200° C. in an atmosphere comprising molecular oxygen; and (d) an anode in contact with said anolyte portion, which anode comprises a porous electroconductive support having an active coating of a mixture of platinum, acetylene black and a binder.

2. A fuel cell according to claim 1 wherein the active platinum surface of the cathode has been heated in an atmosphere containing 1 to 100% molecular oxygen for 1 to 100 hours at 200 to 800° C. and the active coating of the anode contains platinum and acetylene black in a weight ratio of from about 1:20 to 1:1.

3. A fuel cell according to claim 2 wherein the active anode coating is provided with an electrodeposited coating of platinum.

4. The fuel cell of claim 1 wherein the electrolyte is an aqueous solution of sulfuric acid, the peroxygen compound is hydrogen peroxide and the fuel is methanol.

5. A fuel cell according to claim 2 wherein the electrolyte is an aqueous solution of sulfuric acid, the peroxygen compound is hydrogen peroxide and the fuel is methanol.

6. The fuel cell of claim 3 wherein the electrolyte is an aqueous solution of sulfuric acid, the peroxygen compound is hydrogen peroxide and the fuel is methanol.

References Cited by the Examiner

UNITED STATES PATENTS

| 2,612,532 | 9/1952 | Heise et al. | 136—86 |
| 2,720,494 | 10/1955 | Suter | 204—37 X |
| 3,113,049 | 12/1963 | Worsham | 136—86 |
| 3,163,560 | 12/1964 | Grimes et al. | 136—86 |

References Cited by the Applicant

UNITED STATES PATENTS

| 2,706,213 | 4/1955 | Lucas. |
| 3,012,086 | 12/1961 | Vahldrick. |
| 3,013,098 | 12/1961 | Hunger et al. |

WINSTON A. DOUGLAS, *Primary Examiner.*

A. B. CURTIS, *Assistant Examiner.*